April 21, 1970   C. M. KLINE ETAL   3,507,102
ROTARY MOWER DRIVE

Filed May 25, 1967   4 Sheets-Sheet 1

INVENTORS
CHARLES M. KLINE
& ALBERT M. BEST

BY *Joseph A. Brown*
ATTORNEY

April 21, 1970  C. M. KLINE ETAL  3,507,102
ROTARY MOWER DRIVE

Filed May 25, 1967  4 Sheets-Sheet 2

INVENTORS
CHARLES M. KLINE
& ALBERT M. BEST

BY
ATTORNEY

April 21, 1970
C. M. KLINE ETAL
3,507,102
ROTARY MOWER DRIVE
Filed May 25, 1967
4 Sheets-Sheet 3
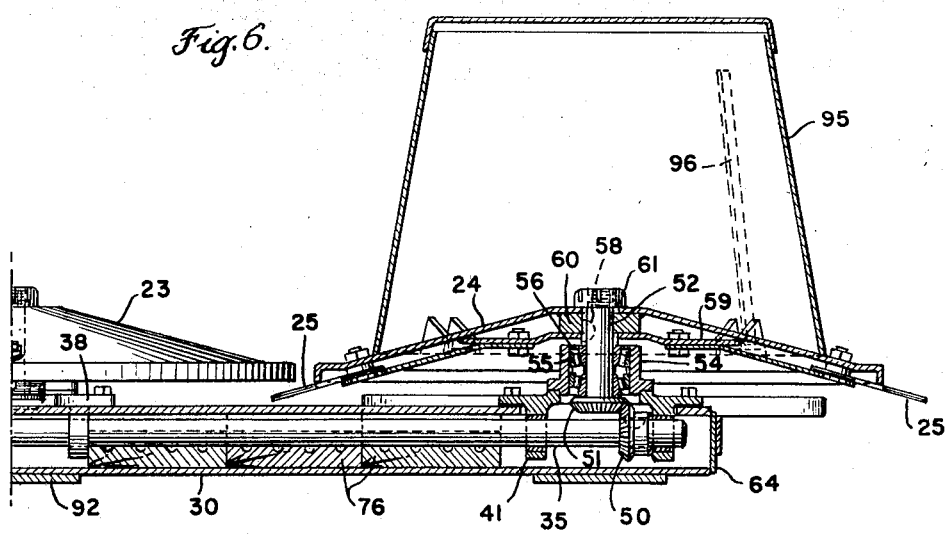
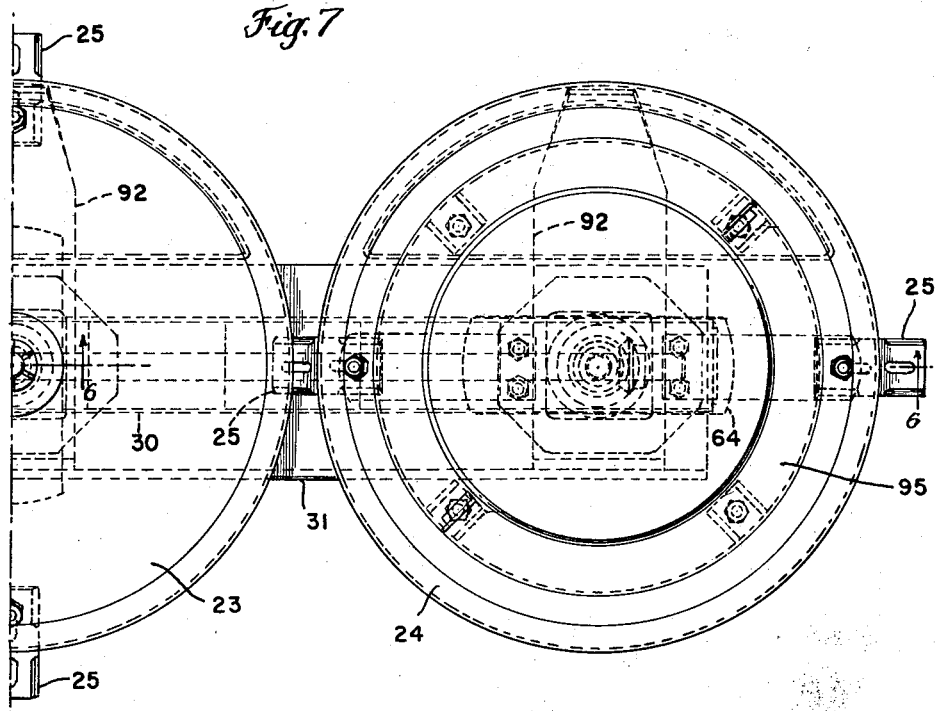
INVENTORS
CHARLES M. KLINE
& ALBERT M. BEST
BY *Joseph A. Brown*
ATTORNEY

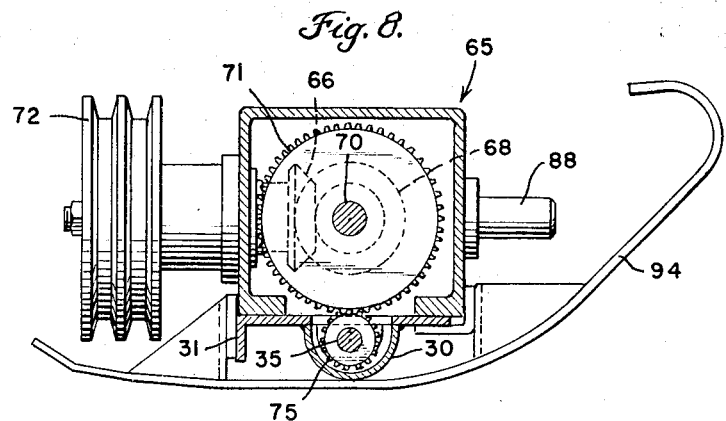

United States Patent Office 3,507,102
Patented Apr. 21, 1970

3,507,102
ROTARY MOWER DRIVE
Charles M. Kline, Reinholds, and Albert M. Best, New Holland, Pa., assignors to Sperry Rand Corporation, New Holland, Pa., a corporation of Delaware
Filed May 25, 1967, Ser. No. 641,212
Int. Cl. A01d 35/26
U.S. Cl. 56—25.4                    8 Claims

ABSTRACT OF THE DISCLOSURE

A rotary mower having a plurality of side by side crop cutting elements rotatable about vertical axes and supported on top of a sealed housing containing a lubricant, each element being driven by a high speed drive shaft and a pair of bevel gears within the housing.

BACKGROUND OF INVENTION

In cutting hay and other crop material, reciprocating mowers are commonly used. To a less extent, rotary mowers are employed having hoods in which one or more blades are rotated and driven from above by a suitable source of power.

When the crop material to be harvested is very dense, both of these types of mowers have considerable operating difficulty. As a result, certain high speed mowers have appeared on the market employing rotatable elements which have very high speeds, such as three thousand r.p.m. One mower of this type has a number of cylinders or drums in side by side relation and supported from above on a transverse bar, relative to ground travel. Rotating power for the drums is supplied from above and the cylinders have free lower ends which carry radially projecting knives to cut the crop material. When such a mower operates, the leverage between the lower cutting ends of the drums and the upper driven ends produces forces which subject the mower frame and the drive to wear. Both the frame and the drive are vulnerable to damage when the lower ends of the drums engage mounds, rocks, tree stumps or other obstructions during operation of the device. To overcome the high load forces developed, heavy and relatively costly frame and drive components have to be provided if the mower is to have a reasonable operating life.

In an attempt to provide lower cost high speed mowers, than the device employing drums supported from above, mowers have been designed which support high speed rotary cutting discs from beneath. Having the discs close to the drive which operates them reduces the leverage factors and cuts down the forces which develop in the operation of the mower. However, such an arrangement involves substantial design difficulties because of the limited space available for the drive beneath the discs. To be efficient, the discs must rotate quite close to the ground. If the drive structure takes up too much room, crop material will be missed. Further, since the discs rotate at high speed, it is important to long operative life that the drive to the discs be provided with a constant supply of lubricant. This is complicated by the fact that the mower is not always operating in a horizontal plane. On hillsides or when the mower is being transported, one end or the other of the mower will be elevated.

SUMMARY OF INVENTION

It is a main object of this invention to provide a high speed, bottom supported, disc-type mower of improved construction over similar mowers of prior design.

Another object of this invention is to provide a mower of the character described which is rugged and will not be vulnerable to damage when operated in adverse crop conditions and terrain.

Another object of this invention is to provide a mower of the character described having a lubrication system whereby all discs are insured adequate lubricant regardless of the position of the mower.

A further object of this invention is to provide in a mower of the character described a drive train which has less gears, less bearings and more versatility than drive trains of prior designs, the drive structure being such that all of the discs may be rotated in one direction, all in the opposite direction, or in any combination of directions.

A still further object of this invention is to provide a rotary mower having a drive structure which will achieve the foregoing advantages in a very limited space whereby the discs can be operated very close to the ground.

A still further object of this invention is to provide a high speed rotary mower which will have a long operating life by resisting both damage and wear and having components which can be assembled and adjusted within minimum difficulty.

Other objects of this invention will be apparent hereinafter from the specification and from the recital in the appended claims.

DESCRIPTION OF THE DRAWINGS

FIG. 6 is an enlarged vertical section of the outboard end of the mower taken generally on the line 6—6 of FIG. 7;

FIG. 7 is a plan view of FIG. 6;

FIG. 8 is a longitudinal vertical section taken on the line 8—8 of FIG. 4 looking in the direction of the arrows;

FIG. 9 is an enlarged vertical section taken on the line 9—9 of FIG. 4;

FIG. 10 is an enlarged vertical section taken on the line 10—10 of FIG. 4 and showing one of the insert lubricant blocks employed in the mower;

FIG. 11 is a plan view of one of the insert blocks and showing in particular the helical groove therein;

FIG. 12 is a perspective view of the insert block;

FIG. 13 is a section taken on the line 12—12 of FIG. 9 looking in the direction of the arrows and showing the drive shaft support means for one of the discs;

DESCRIPTION OF THE PREFERRED EMBODIMENT

Figure 1:
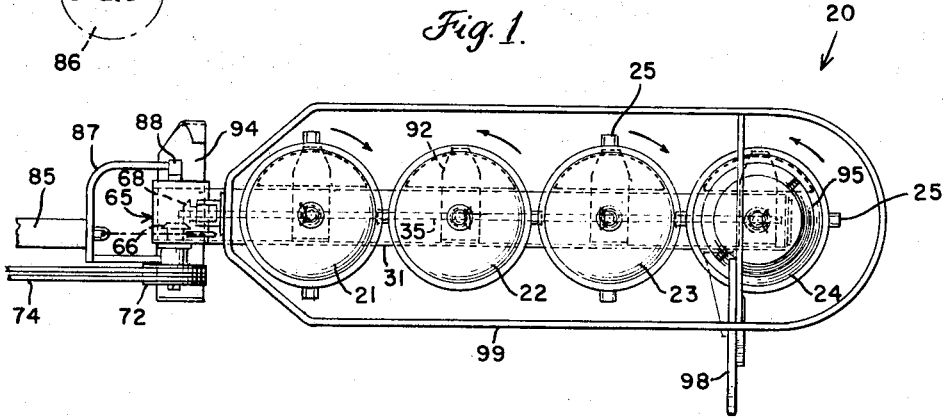
FIG. 1 is a plan view of a high speed rotary mower constructed according to this invention.

Referring now to the drawings by numerals of reference, 20 denotes generally a rotary mower comprising four rotatable cutting elements in the form of discs 21, 22, 23 and 24 which extend in common horizontal planes in side by side relation and rotatable about vertical axes. Each of these discs has two knife elements 25 which project radially outwardly of the periphery of the disc and the knife elements are mounted one hundred and eighty degrees apart from each other. The discs are dish-shaped with their convex sides facing upwardly. The discs are located so that the knives of one disc will overlap the cutting path cut by the knives of an adjacent disc. The discs are rotated by means, subsequently described, in timed relation to each other so that the knives on one disc will not engage the knives on an adjacent disc.

The discs 21–24 are carried on a U-shaped support 30 which extends transversely relative to ground travel with the bight of the U facing upwardly and the curved portion downwardly as shown best in FIGS. 8–10. The upper ends of support 30 are interconnected by a horizontal portion of an L-shaped plate 31 and the support and plate are welded together at 32 to provide a unitary rigid housing.

Extending throughout the length of support 30 is a high speed drive shaft 35. Plate 31 has an opening 36 (FIG. 9) beneath each cutting disc and overlying this opening is a flat member 38 connected to plate 31 by bolts 39. A gasket or seal 40 is provided around the opening and clamped between plate 31 and member 38. As shown in FIG. 13, each member 38 has a pair of depending lugs 41 spaced from each other and each having a bore 42. The bore in one lug is coaxial with the bore in the other lug. Further, the bores in the lugs of each member 38 are coaxial and they serve as supports for drive shaft 35. A bushing 44 is provided within the bore 42 of each lug 41 to provide a bearing support for shaft 35.

Figure 16:
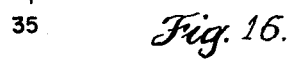
FIG. 16 is a fragmentary view illustrating the key arrangement on the drive shaft whereby the bevel gears for a particular disc may be located in one of two positions.

At each disc location, shaft 35 is provided with a pair of key slots 45 and 46 (FIG. 16) which are spaced along the axis of the shaft. When the mower structure is assembled, there are two key slots between each pair of lugs 41 on its associated member 38. Each disc is driven by a first bevel gear 50 keyed to shaft 35 and a second bevel gear 51 integral with a vertically extending shaft 52. As shown best in FIG. 6, member 38 supports a collar 54 which encloses a pair of tapered roller bearings 55 one above the other around shaft 52 and above bevel gear 51. Collar 54 is tightly bolted to member 38 to be immovable relative thereto and if desired, members 38 and 54 can be made as a one-piece casting. At the upper end of collar 54, a seal 56 is provided. Above this seal, the associated disc, in this case the disc 24, is keyed at 58 to shaft 52. Each disc has a web element 59 and interposed between this and the upper middle end of the disc is a spacer 60. This assemblage is clamped by a nut 61 tightly applied to the upper end of shaft 52 which is suitably threaded.

Figure 4:
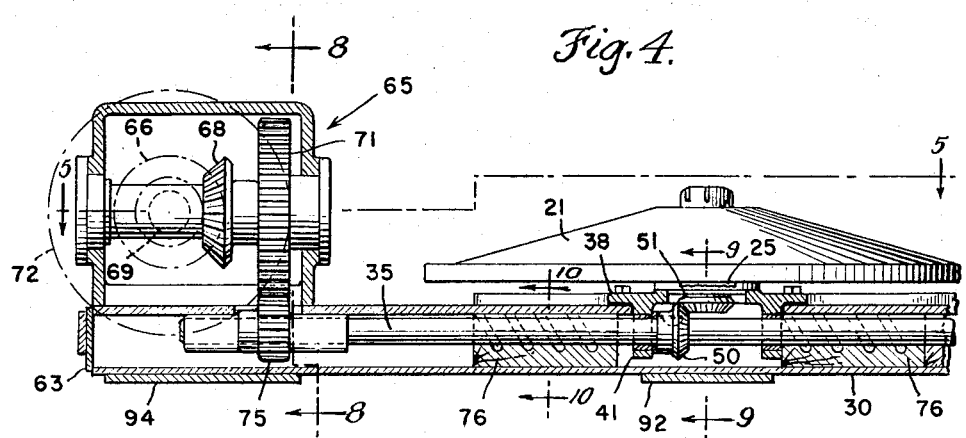
FIG. 4 is an enlarged vertical section of the inboard gearbox end of the mower taken approximately on the line 4—4 of FIG. 5 looking in the direction of the arrows.

The inner end of housing 30 is sealed shut by a closure 63 (FIG. 4) welded in place. The outboard end of housing 30 is closed by a similar closure 64 (FIG. 6) also welded in place. At its inboard end, drive shaft 35 is connected to a power source comprising a gearbox 65 having bevel gears 66 and 68, a power input shaft 69, a power output shaft 70, and a spur gear 71, all suitably journalled within the box. The axis of input shaft 69 is transverse to the axis of the drive shaft 35. The input shaft projects outwardly of the gearbox and has connected to it a double sheave 72 adapted to be connected to a tractor power-take-off shaft, not shown, by the drive belts 74 shown in FIGS. 1 and 2. The spur gear 71 meshes with a spur pinion 75 keyed to the inboard end of drive shaft 35. The output shaft 70 of the gearbox has an axis parallel to the axis of drive shaft 35 and they are in the same vertical plane.

The drive to shaft 35 is high speed and the gear ratios are such that the discs 21–24 rotate at a speed such as three thousand r.p.m. To keep each of the disc drive units lubricated, gearbox 65 and the chamber formed by housing 30 are filled with oil. To insure a supply of oil at the outboard end of housing 30 and to reduce the volume of oil required in the unit, spacer blocks 76 are provided which are preferably made of wood, but also may be made of plastic or other material. There are a plural number of spacer blocks 76 within housing 30 and each has a curved bottom surface 78 which matches the curved inner surface of the housing. Also, it will be noted from FIG. 10 for example that housing 30 is generally concentric to the axis of shaft 35.

The upper end of each block 76 has a flat surface 79 which engages the underside of plate 31 and this surface is provided with a longitudinal curved bottom groove 80 into which drive shaft 35 seats. Groove 80 is provided with a longitudinal helical groove 81 which extends from one end of each insert block to the other and communicates with the periphery of drive shaft 35. The high speed rotation of shaft 35 in combination with the helical groove 81 produces an auger affect which causes the oil within housing 30 to move axially from the gearbox end of the drive toward the outer end of the mower. A continuous supply of lubricant is thus assured for the outer disc 24. Upward movement of oil through the bearing supports for each disc is restricted by the upper seal 56 in each mounting.

It has been found that with the helical groove 81, a pressure head of oil builds up at the outer end of the mower. Therefore, each insert block is provided with a pair of longitudinal grooves 82 spaced radially from the periphery of drive shaft 35 and extending throughout the length of each block. Therefore, the oil which has been conveyed axially toward the outboard end of the mower is allowed to return through the longitudinal grooves. With this structure, a continual circulation of lubricant throughout the housing 30 is provided.

Figure 5:
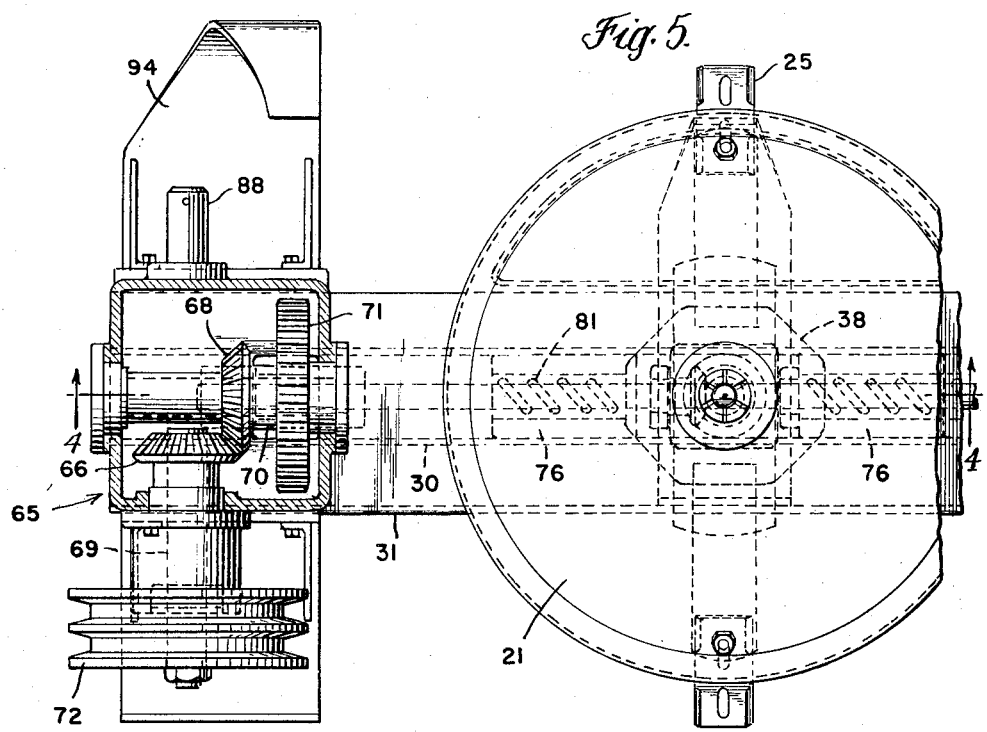
FIG. 5 is a plan section of FIG. 4 and taken on generally the line 5—5 of FIG. 4.

Mower 20 is adapted to be mounted on a tractor to project laterally thereof as the tractor travels over a field having crop material to be cut. A portion of the tractor frame is shown at 85 in FIGS. 1 and 2 and one tractor wheel is indicated in dotted lines at 86. Gearbox 65 has a forwardly projecting stud 88 (FIG. 5) to which a tractor bracket 87 is connected for supporting the mower. There is also a lift structure which includes a vertically extending arm 89 and a chain connection 90 to a suitable top connection point 91 on gearbox 65. When in operating position, mower 20 rests upon the ground G as shown in FIG. 2. There is a support shoe 92 beneath each cutting disc and a shoe 94 beneath gearbox 65. The shoes 92 and 94 extend beneath housing 30 and they are curved upwardly and forwardly. These shoes provide optimum guiding of the discs in the operation of the mower and render the structure responsive to obstructions encountered.

Figure 2:
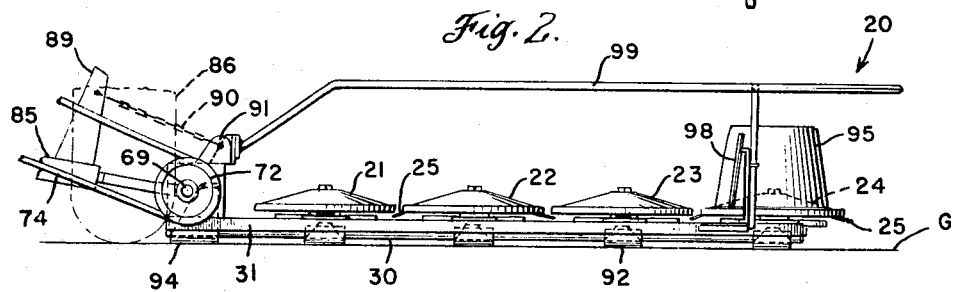
FIG. 2 is a side elevational view of the mower.
Figure 3:
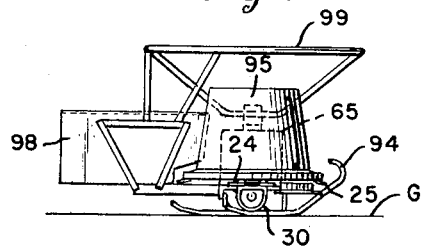
FIG. 3 is an end view of the mower looking from right to left of FIG. 2.

Preferably, the bevel gears on shaft 35 are so located that when viewed as shown in FIG. 1, disc 21 and disc 23 rotate in a clockwise direction and discs 22 and 24 rotate counterclockwise. In this way, the pairs of discs cooperate with each other and discs 21 and 22 deliver cut material rearwardly between them and discs 23 and 24 do likewise.

To facilitate the separation of the material to be mowed with the standing crop material, a truncated cone 95 is mounted on top of the outer disc 24 and it has vertically extending ribs 96 which project outwardly of the drum to facilitate engagement and movement of the crop material. To prevent the material at the outboard end of the mower from being swept laterally as it passes from disc 24, a baffle or deflector 98 is provided rearwardly of disc 24. To prevent injury to persons around the mower, a safety fence 99 is also provided, as shown in FIGS. 1 and 2.

Figure 14:
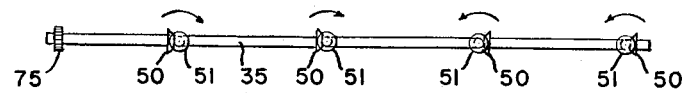
FIGS. 14 and 15 are views showing the drive shaft and bevel gear arrangements whereby the disc may be rotated in directions different from that shown in FIG. 1.
Figure 15:
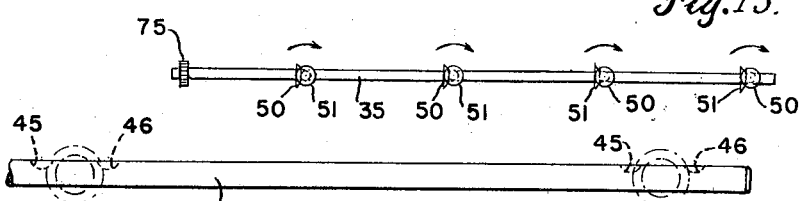

As an alternate to having counter rotating pairs of discs as shown in FIG. 1, the bevel gears on shaft 35 may be arranged as shown in FIG. 14 to have the two inboard discs rotate in a clockwise direction and the two outboard discs rotated counterclockwise. In this arrangement, the material will be deposited in a single windrow between the two middle discs 22 and 23. Also, if desired the bevel gears can be placed to rotate all of the discs in the same direction as shown in FIG. 15 or they can be arranged to rotate all of the discs in the opposite direction. Any combination of disc rotations may be employed to produce the results desired.

The mower thus described has a rugged, simple, compact support frame which will operate in a field for long periods of time without the need of service or repair. The curved bottom surface of the housing 30 will ride over ground obstructions and the generally one piece welded construction of the unit provides a sturdy unitary structure. The seals for the housing coupled with the lubrication conveying means insures that each of the discs will be continuously and properly lubricated. Further, the drive sheave 72 is so located that the mower may be connected to a conventional mower mounting structure. In this way, the farmer having a conventional reciprocating mower can disconnect the reciprocating structure and mount the present mower in its place.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A rotary mower comprising
   an elongated housing having a top wall and means at one end for supporting said housing to extend adjacent to the ground and transverse to the direction of travel;
   drive means extending longitudinally within said housing;
   a plurality of shafts extending through said top wall and longitudinally spaced along said housing and coupled to said drive means for rotation about a respective axis;
   a plurality of cutting elements mounted on said shafts, respectively, in side by side relation for rotation about respective axes of said shafts;
   each of said cutting elements having dish shaped disc with a convex side facing away from said top wall and having knife means mounted on said disc for cutting crop material on rotation of said cutting elements by said drive means, and
   said disc at the end of said housing remote from said support means having a truncated cone mounted thereon with crop engaging rib means for separating cut crops from standing crops.

2. A rotary mower as recited in claim 1 wherein said end disc and cone rotate in such direction that said knife means thereon travel outwardly and forwardly, then inwardly and forwardly, then inwardly and rearwardly and then outwardly and rearwardly, and a fixed vertically extending baffle supported on said housing in a position to intercept the deflect cut crops from the portion of the disc travelling rearwardly and outwardly.

3. A rotary mower comprising
   an elongated housing having opposite ends with means at one end for supporting said housing adjacent the ground and transverse to the direction of travel and a top wall with a plurality of longitudinally spaced openings,
   a high speed drive shaft within said housing extending generally from one end to the other,
   a plurality of cutting elements above said top wall of said housing in side by side relation and rotatable about vertically extending axes,
   each of said cutting elements having knife means thereon for cutting standing crops and a shaft projecting through said top wall into said housing,
   a pair of gears to drive each cutting element, one gear being connected to said drive shaft and the other gear to the shaft of its associated cutting element,
   means for connecting one end of said drive shaft to a power source,
   means for sealing said housing to provide a lubrication tight chamber in which said drive shaft and gears operate, and
   means between said gears cooperating with said drive shaft to move lubricant along said shaft from said one end and toward the opposite end thereof.

4. A rotary mower as recited in claim 3 wherein said lubricant moving means comprises insert blocks within said housing between said bevel gears and each block having a helical groove from one end of the block to the other communicating with the periphery of the drive shaft to urge the travel of lubricant responsive to high speed rotation of said shaft.

5. A rotary mower as recited in claim 3 wherein said lubricant moving means includes return flow means to allow the lubricant to flow from the opposite end of said housing toward said one end.

6. A rotary mower as recited in claim 3 wherein said return means comprises insert blocks between said gears on said drive shaft and having longitudinal grooves from one end of each block to the other and radially spaced from the periphery of the drive shaft.

7. A rotary mower comprising
   an elongated housing having opposite ends with means at one end for supporting said housing adjacent the ground and transverse to the direction of travel and having a top wall with a plurality of longitudinally spaced openings,
   a high speed drive shaft within said housing extending generally from one end to the other,
   a plurality of cutting elements mounted on top of said housing in side by side relation and rotatable about respective axes,
   each of said cutting elements having knife means thereon for cutting standing crops and a shaft which projects into said housing through a respective opening,
   a pair of bevel gears to drive each cutting element, one bevel gear being connected to said drive shaft and the other gear to the shaft of its associated cutting element,
   means for connecting one end of said drive shaft to a power source,
   means for sealing said housing to provide a lubrication tight chamber in which said drive shaft and bevel gears operate, and
   said top wall having support plates detachably mounted over a respective opening and each support plate having a pair of spaced depending lugs with co-axial bores said lug bores of said support plates being aligned to provide aligned spaced supports for said drive shaft.

8. A rotary mower as recited in claim 7 wherein the pair of bevel gears for a cutting element are located between the lugs of the support plate for that cutting element, the gear on the drive shaft being selectively attachable to one of two positions on the shaft, one position being adjacent one lug and the other adjacent the other lug, and when in said one position rotating its cutting element in one direction and when in the other position rotating its cutting element in the opposite direction.

References Cited

UNITED STATES PATENTS

| | | | |
|---|---|---|---|
| 262,637 | 8/1882 | Blanchard | 56—295 |
| 507,962 | 10/1893 | Beermaker | 56—255 |
| 894,887 | 8/1908 | Holland | 56—255 |
| 1,397,365 | 11/1921 | Cook | 56—295 XR |
| 2,625,784 | 1/1953 | Kelsey | 56—295 XR |
| 3,066,745 | 12/1962 | Smith et al. | 56—25 XR |

RUSSELL R. KINSEY, Primary Examiner

U.S. Cl. X.R.

56—295